United States Patent
Schleicher

(10) Patent No.: US 10,803,225 B2
(45) Date of Patent: Oct. 13, 2020

(54) PERIPHERAL TOOL

(71) Applicant: EFINIX, INC., Milpitas, CA (US)

(72) Inventor: James Schleicher, Los Gatos, CA (US)

(73) Assignee: EFINIX, INC., Milpitas, CA (US)

( * ) Notice: Subject to any disclaimer, the term of this patent is extended or adjusted under 35 U.S.C. 154(b) by 0 days.

(21) Appl. No.: 16/256,770

(22) Filed: Jan. 24, 2019

(65) Prior Publication Data

US 2020/0242210 A1 Jul. 30, 2020

(51) Int. Cl.
*G06F 30/39* (2020.01)
*G06F 30/392* (2020.01)
*G06F 30/394* (2020.01)
*G06F 115/10* (2020.01)

(52) U.S. Cl.
CPC .......... *G06F 30/392* (2020.01); *G06F 30/394* (2020.01); *G06F 2115/10* (2020.01)

(58) Field of Classification Search
CPC .............................. G06F 30/392; G06F 30/394
USPC .......................................... 716/118, 119, 122
See application file for complete search history.

(56) References Cited

U.S. PATENT DOCUMENTS

| | | | |
|---|---|---|---|
| 6,769,107 B1* | 7/2004 | Watkins | G06F 30/34 716/104 |
| 7,017,136 B2* | 3/2006 | Ting | H03K 19/17704 326/38 |
| 2019/0138680 A1* | 5/2019 | Teh et al. | G06F 15/7825 |
| 2019/0146943 A1* | 5/2019 | Fender et al. | G06F 13/4022 710/105 |

* cited by examiner

*Primary Examiner* — Sun J Lin
(74) *Attorney, Agent, or Firm* — Womble Bond Dickinson (US) LLP

(57) ABSTRACT

A system having design tools and methods using the same design tools in designing an integrated circuit (IC) are described. In one embodiment, an IC design system comprises, the system comprises one or more processors; and a non-transitory computer readable medium connected to the one or more processors, wherein the non-transitory computer readable medium is configured to store: of a first design tool module configured to determine one or more design specifications for a core of an integrated circuit (IC), the IC comprising a plurality of transistors and other components, and a plurality of interconnects between the plurality of transistors and the other components, wherein the plurality of transistors and the other components and the plurality of interconnects are formed on a single die, and a second design tool configured to determine one or more design specifications for a periphery of the IC, the second design tool module to function independently of the first design tool module and operable to design constraints for interface placement and configuration of an interface between the core and the periphery of the IC.

18 Claims, 4 Drawing Sheets

PERIPHERAL TOOL

FIELD OF THE INVENTION

Embodiments of the present invention relate generally to electronic design automation; more specifically, embodiments of the present invention relate to using separate design tools to design the core and periphery of an integrated circuit (e.g., field programmable gate array (FPGA)).

BACKGROUND

A Field Programmable Gate Array (FPGA) is a silicon product that performs different hardware functions based on a configuration pattern that is used to program it. An FPGA traditionally consists of two major parts. The first part is the FPGA programmable fabric or core where the general logic functions are implemented. Traditionally, the programmable fabric consists of a sea of programmable logic blocks interconnected by programmable routing. Typical logic blocks include look-up-tables (LUTs), registers (e.g., flip-flops), configurable memory and digital signal processor (DSP) (aka multiplier) blocks. Also, FPGAs includes a clock network to control the synchronous elements. The second part is referred to as the periphery, which is made up of blocks used to interface between other silicon devices and the programmable fabrics. There is a large and evolving set of interface blocks being used in the periphery of FPGAs. Some typical examples are general purpose input/output (TO) (GPIO), phase-locked-loops (PLLs), (DDR) memory, complex protocols such as Peripheral Component Interconnect (PCI)-Express, Mobile Industry Processor Interface (MIPI), etc. Similar to the core, the periphery can be configured to perform different functions, but are more protocol specific than the general-purpose nature of the core.

FPGA design tools are used to generate the configuration information needed to program the FPGA silicon. Traditionally, this is done by describing a design in a hardware design language (HDL) like Verilog or VHSIC Hardware Description Language (VHDL) and then "compiling" it for the FPGA. Compilation involves synthesizing the design into a netlist of interconnected logic blocks (synthesis), placing the blocks into viable locations in the FPGA (placement), connecting all logic block inputs and outputs via the programmable routing fabric (routing) and finally generating a configuration bit-stream.

The challenge for FPGA design tools is the difference between the peripheral and core logic and the best method to allow users to define the functionality to be implemented in them. Although the core logic blocks may be implemented in a large variety of techniques, they are designed to be compatible with a fairly standard FPGA synthesis, place & route flow where the user can define the intended functionality in industry standard behavioral HDL and the FPGA design tools infer the logic blocks required. This allows the design to be easily targeted to different core arrays and even potentially different FPGA tools. Because the core blocks in different FPGAs can be supported through common algorithms, those algorithms can be improved, thereby resulting in better quality of results for all designs.

The peripheral blocks, on the other hand, tend to be very application specific in their design and implementation, usually requiring a user to instantiate and manually configure the specific logic block needed. Further the logic block implementations tend to change over time (in different FPGA versions) and these new blocks tend to not be compatible with the previous implementations and their configuration. This results in a very different flow for the users and the FPGA tools.

A traditional method for handling the difference in design requirements for the periphery and core logic is for the user to combine manual instantiation with behavioral HDL for inference. In this case, the user would create a design with instantiated logic blocks, defining the functionality of the peripheral blocks, and then would add behavioral HDL to define the functionality to be implemented in the core blocks.

A prior art FPGA flow begins with a user design containing both the instantiations of the peripheral blocks and the definition of the logic to be implemented in the FPGA core. The first step of the FPGA design tools is to perform synthesis and technology mapping on the combined user design in order to synthesize it into blocks that can implement the functions of the design. Some blocks are part of the FPGA periphery and others are part of the FPGA core.

After synthesis, placement occurs in which the blocks are assigned to legal locations while trying to optimize the locations to result in improved performance by locating blocks with time critical relationships near each other, while at the same time trying to anticipate the routing requirements required in the next step. This is a problem with non-deterministic polynomial-time (NP)-hard complexity, which requires complex heuristics to achieve good solutions.

Although it would appear to be beneficial to combine the placement of the peripheral blocks with the core block so that the combined solution can be optimized, the peripheral blocks tend to have much more restrictions on their legal placements and different restrictions block-to-block. Therefore, most modern FPGA tools solve the placements somewhat independently. Even so, because of their shared netlist, they cannot be completely separated.

After placement has been performed, routing is performed to determine if a legal solution can be found for the programmable connectivity between the blocks. This is again an NP-hard problem requiring a complex heuristic. Also, similar to the above discussion, the routing problem is very different between the peripheral and core blocks, but the problems cannot be completely separated because of the shared design netlist.

Finally, after successful routing is performed, bit-stream generation is performed. For the most part, this is a deterministic translation of the placement and routing solution and the functionality of the blocks to a programming file that can be used to configure an FPGA to perform the user function.

An advantage of the traditional approach is that the design used to describe the functionality can be used for functional validation of the complete design implemented in the FPGA. A major disadvantage of the traditional approach is that because the peripheral portion of the design is combined with the core portion, the FPGA tools must account for both types of blocks. This means that the algorithms designed to place and route the core logic must account for the large variety of peripheral blocks and their irregular requirements. For example, an FPGA might contain a single PCI-Express block leaving only a single legal placement and routing solution based on its configuration. However, different configurations could require unique routing solutions, and thus, the FPGA place and route algorithms need to account for all these unique rules, thereby making the development of improved algorithms and heuristics more difficult.

Further, the combined designs make it difficult for the user to control how the design is implemented in the core and periphery, particularly when trying to migrate a design between devices with different peripheries or to modify only the behavior of a portion of the design in the periphery which should have no direct effect on the core.

SUMMARY OF THE INVENTION

A system having design tools and methods for using the same in designing an integrated circuit (IC) are described. In one embodiment, an IC design system, the system comprises one or more processors; and a non-transitory computer readable medium connected to the one or more processors, wherein the non-transitory computer readable medium is configured to store: a first design tool module configured to determine one or more design specifications for a core of an integrated circuit (IC), the IC comprising a plurality of transistors and other components, and a plurality of interconnects between the transistors and the other components, wherein the plurality of transistors and the other components and the plurality of interconnects are formed on a single die, and a second design tool module configured to determine one or more design specifications for a periphery of the IC, the second tool to function independently of the first tool and operable to design constraints for interface placement and configuration of an interface between the core and the periphery of IC.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

A method and apparatus for designing an integrated circuit (IC), such as, for example, a core are described herein. In one embodiment, the techniques for designing an IC (e.g., FPGA) solve one or more problems discussed above by completely separating the design of the periphery and core into two separate design tools, where one tool defines the functionality of the periphery and the other tool defines the functionality of the core. Each of these two design tools is able to function completely independently of the other, so that that they can be optimized independently. To accomplish this, any dependencies between the implementation of the design in the periphery and the core are identified in constraints passed to the two tools.

The following describes the techniques for designing an IC in the context of an FPGA. However, one skilled in the art would recognize that these techniques are applicable to ICs in general.

In one embodiment, all of the dependencies between the core and periphery designs are contained in interface blocks. These interface block are blocks built into the FPGA core and provide the top-level design pins (inputs and outputs) for the FPGA design. One or more of interface blocks also provide access from the FPGA core clock-tree to the peripheral blocks for synchronization, thereby defining which clocks are needed at which interface blocks for the periphery to use. In one embodiment, the interface blocks also synchronize signals between the periphery and core, as well as perform inversion and generate supply voltage (e.g., VCC) and ground voltage (GND) signals for the peripheral blocks.

Figure 1:
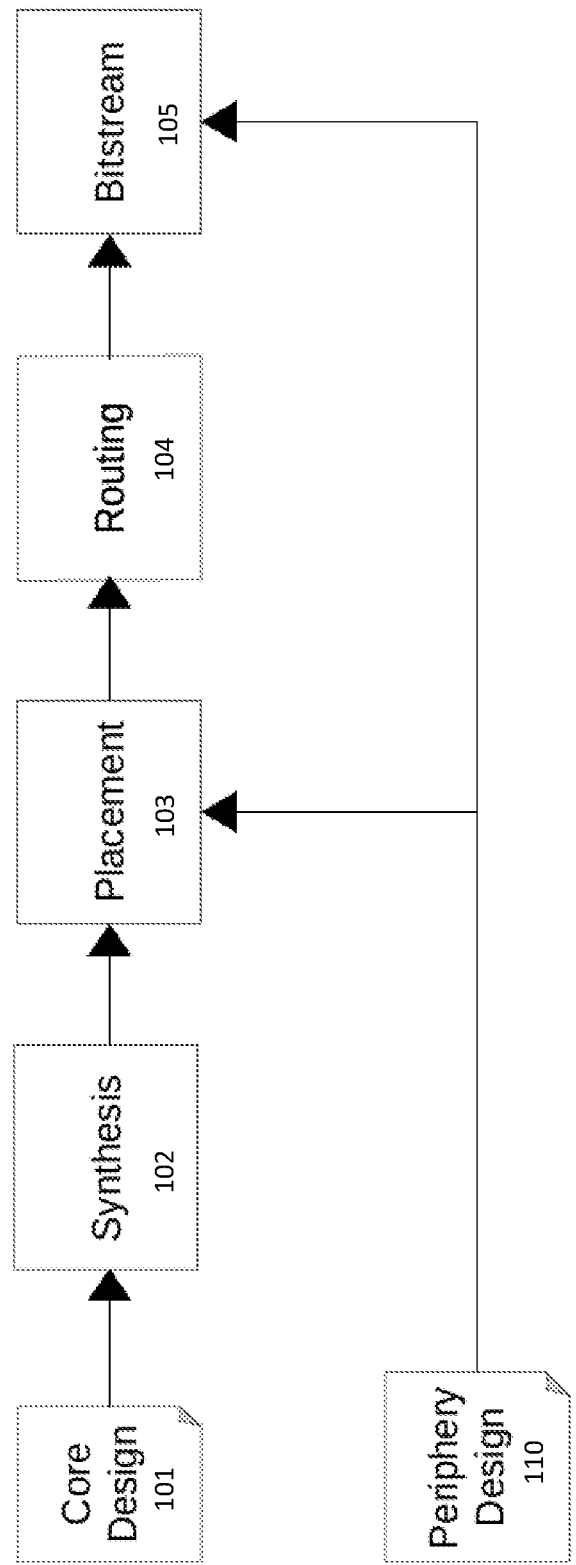
FIG. 1 is a data flow diagram of one embodiment of a FPGA process flow.

FIG. 1 is a data flow diagram of one embodiment of a FPGA process flow. Referring to FIG. 1, the core design 101 is separated from the periphery design 110 and is supported by a traditional FPGA electronic design automation (EDA) flow. More specifically, the design flow for core design 101, which includes the following stages comprising synthesis 102, placement 103, routing 104 and bitstream generation 105, is kept separate from periphery design 110. In one embodiment, the periphery design 110 is kept completely separate and supported by a new interface designer tool, referred to herein as the "Peripheral Tool." To align the solutions between the periphery and the core, the Peripheral tool provides information about how all the connections are made between the core and the periphery and this information is used to guide the placement and routing stages of the core design. Additionally, the Peripheral Tool provides the configuration information for the peripheral blocks to be combined with the configuration information for the core.

An Example of the Peripheral Tool

In one embodiment, the Peripheral Tool allows users to define the functionality of the periphery. In one embodiment, this tool is highly flexible with a plug-in architecture where individual peripheral block types have their own unique tool plug-in responsible for providing the graphical user interface (GUI), rules checking and constraint generation for the block. This allows a developer to design an optimized design entry method based on the type of block being configured. That is, the plug-in architecture allows the different blocks to be combined in a flexible manner because the individual peripheral blocks function independently of other blocks, and each one is responsible for defining the information needed to be passed to the core design. In one embodiment, the functionality of the peripheral blocks is defined in a manner that reduces, and potentially minimizes, their interaction with one another. When there are shared resources in the periphery or shared interfaces with the core, the hardware specification/requirements are captured as a shared device block, while the peripheral design elements remain independent blocks. When required, an independent validation module is used to validate that the design blocks are sharing the device blocks legally. Thus, the framework then allows for the different blocks to be combined in a flexible manner to quickly support many unique device peripheries.

In one embodiment, this framework is implemented in an open object-oriented interpreted language (e.g., Python)

with a large user base, thereby eliminating the need for software developers with scarce background in FPGA place and route algorithms.

In one embodiment, the output of the Peripheral Tool is the following:
Behavioral simulation netlist
core FPGA pin placement
core FPGA interface configuration
Periphery configuration bits Each of these is described in more detail below.

Behavioral Simulation Netlist

With the user-defined functionality of the periphery in the Peripheral Tool rather than an HDL netlist, the Peripheral Tool generates a behavioral simulation netlist that represents the functionality of the periphery.

In one embodiment, each peripheral block plug-in is responsible for instantiating the behavioral model for their block and applying the appropriate parameterization. In one embodiment, Verilog behavior simulation models for every peripheral design block are created and used. The plug-in is responsible for translating the user's configuration of the block into Verilog parameters. In one embodiment, the plug-in is also responsible for defining the instance name of the block and the names of the names of the core pins connected to the block pins.

In one embodiment, a common engine for the Peripheral Tool is then responsible for generating a complete netlist that connects the peripheral block model instantiations to each other and to the FPGA HDL netlist to be implemented in the core. That is, The Peripheral Tool generates the top-level netlist that instantiates all the peripheral blocks and the core FPGA design and connects them together. More specifically, an independent module uses information contained in a device model of the periphery including the connectivity between peripheral blocks and the FPGA core pins, as well as top-level device pads, to construct a Verilog netlist instantiating and connecting the peripheral blocks to the user design in the FPGA core. In one embodiment, in order to generate the complete netlist, the Peripheral Tool captures the user names for all the signals that will become the top-level pin names in the core HDL netlist, including suggesting names that the user can just accept, and then generating a template HDL file that defines the core HDL top-level module and ports which match these names. In one embodiment, this netlist is the same as the combined netlist used in the traditional FPGA flow, except it is only used for the verification of the full design. In one embodiment, only the user's FPGA core design is passed to the traditional FPGA flow.

Core FPGA Pin Placement

The FPGA core connects to the FPGA periphery through core FPGA pins. In one embodiment, the FPGA core software has virtually no knowledge of what it is connected to in the periphery, so the Peripheral Tool is responsible for providing constraints for every FPGA core pin used in the FPGA design. In one embodiment, one of the constraints is that if a pin is specified in the core then it must be used and have a connection to at least one block in the periphery. In one embodiment, the Peripheral tool provides constraints for every FPGA core pin used in the FPGA design using an interface file. An example of the interface file is described in more detail below.

Core FPGA Interface Configuration

There is additional logic at the interface between the FPGA core and the periphery, which is controlled by configuration bits within the core but is not represented by the FPGA design passed to the core. This additional logic is referred to herein as an interface block. In one embodiment, this interface block is part of the FPGA core and the bit settings are a responsibility of the core FPGA tools. In one embodiment, the Peripheral Tool is responsible for providing the information for configuring this interface. In one embodiment, this information passed to the core FPGA tools by the Peripheral Tool defines everything the core FPGA tools need to know to determine how to set the interface configuration bits.

In one embodiment, the interface configuration bits enable configuration of multiple parts to be configured. First, in one embodiment, every signal in and out may be synchronized by an interface register. If any synchronization is done, the clock is selected. Also a clock may be routed to the periphery to be used in the periphery block using the same assignment. For example, registers are used to synchronize signals passing from the core to the periphery. To have a robust timing closure solution, the registers are connected to the clock tree of the core. In other words, these bits cause the register to be connected to the clock tree. These are considered requirements of the peripheral block, and therefore are not represented in the FPGA design, but is used to configure the bit settings since the interface block is part of the core and uses core configuration bits.

In one embodiment, there are two different designs for the interface block and a defined syntax is used for constraining both types. In one embodiment, the interface constraint definition is changed depending on the features of the new interface block.

Additionally, based on the configuration of the periphery, some connections to/from the core may be critical or completely optional. Since the core FPGA tools have no prior knowledge of the importance of a connection, the tools cannot determine if a problem in the FPGA core design is critical or of no consequence. In one embodiment, the Peripheral Tool passes information about the criticality of pins used in the interface to the core FPGA tools so they can give the user appropriate feedback. In one embodiment, the Peripheral Tool determines if a pin exists, which infers it is critical, and assumes that the default behavior is to use the pin. Therefore, if the pin is critical and the pin doesn't exist in the netlist, then the core FPGA Tool provides a warning or error.

Periphery Configuration Bits

Finally, the configuration information needed to configure the periphery is not known by the core design tools. Therefore, the Peripheral Tool provides this information to the core design tool to be combined with the configuration information for the core. In one embodiment, the logical bit files (LBF) defines the logical configuration information for the core, and the Peripheral Tool is responsible for generating the configuration bit-settings for the periphery of the LPF file. The LPF defines the logical configuration information for the periphery. In one embodiment, the LPF is based on a mapping file which defines the function of each logical configuration bit and the physical organization of those bits in the periphery, including the way they are chained together. The Peripheral Tool passes the LPF file and the mapping file to the core FPGA tools along with the configuration mode and then the FPGA core programmer is able to determine the physical arrangement of the configuration bits for both the core and periphery. The physical arrangement of the logical configuration bits that needs to be passed to the FPGA control block is then generated from the LBF based on the configuration mode.

The control block of the FPGA takes configuration bits and uses them to program the configuration elements of the FPGA. The physical arrangement of the configuration bits in the programming stream is dependent on the mode of configuration used. For example, a simple ×1 configuration uses one pin to stream in the configuration image one bit at a time, while ×8 mode uses 8 pins to pass in 8 bits at a time. The 8 bits are usually sent to 8 independent configuration chains to allow the device to configure 8 times faster, but that requires the bits to be physically arranged differently.

Core FPGA Tools

Since the Peripheral Tool handles generating all the information for the periphery design including the constraints on the interface placement and configuration, the core FPGA tools only have to be responsible for the implementation of the core design. This allows the scarce experts in FPGA synthesis, place and route algorithms to focus on solving the traditional problems of FPGA synthesis, placement and routing.

Embodiments of the present invention include one or more of the following benefits. For example, the completely independent tools allow for completely independent tool development. This means that different design teams with different skills and expertise can be designing the core and periphery. The different design teams could be from different companies and/or can design different peripheral block types. Because different design teams may be involved, the design tools for the core and the periphery can have different release schedules and new peripheral functionality can be added without changing the core tools support. Furthermore, having completely independent tools allows for tools for some or all peripheral blocks while maintaining secure tools for others. Moreover, having completely independent tools allows for potentially different core design tools since the core tools are more standard.

Also, completely independent tools allow for independent user flows. This means that a system architect for a customer can design a common periphery for one or more devices independent of the core design. Then, different FPGA designers can easily use the peripheral design with different core designs.

This also means that a user can migrate a design from one FPGA device to another. Since the FPGA design is completely independent of the periphery no functional changes to the FPGA design are needed to re-target it at the new FPGA. Instead, the periphery is migrated independently and then any changes required to interface with the core can be made to the core FPGA design.

Overview of One Embodiment of an Interface File

In one embodiment, syntax is used for describing the functionality of all the interface blocks used in a specific user design and that is used to generate an interface constraint file which tells the core FPGA EDA tools everything it needs to know about connecting to the periphery. This interface file contains information about how the core is interfaced to the SoC or a programmable product (e.g., FPGA) that instantiates it. It is used by the Peripheral Tool to configure the device models used by the hardware designer.

In one embodiment, for each used core pin, the following information is passed by the Peripheral Tool:

TYPE: Is this the input, output or clkout pin in the interface block.
LOCATION: Core X, Y location of the Interface block this pin is associated with. And the Z index of the pad in that block.
CLOCK: Which logical clock is used with this pin.
CLOCK SENSE: Polarity of the clock used to synchronize this pin.
NAME: The logical name of the pin in the user design implemented in the core.
REQUIRED: Is this pin required to be used in the FPGA design. An error is generated if missing.
PIN_SENSE: For output pins is the pin inverted in the interface block.
VCC or GND: For output pins is the value a constant VCC or GND generated by the interface block.

In one embodiment, a Comma Separated Values (CSV) file to define the interface configuration, and it defines the interface behavior of every used pin of the Quantum core. Below is an example format of the file and some example constraints.

```
# [required](input|output|clkout), x, y, z, ___bypass___| [!|~]<clock>,
[[!|~]<piname>] | ___vcc___ | ___gnd___
input,0,38,1,___bypass___, clk
input,0,2,3,clk,d[0]
input,0,13,1,~clk,d[1]
output,24,2,0,!clk,q[0]
output,24,5,2,___bypass___,q[1]
required output,24,5,0,___bypass___,pll_reset
clkout,24,5,-1,clk
clkout,0,5,-1,~clk
```

The first field defines the type. In one embodiment, pins can be of three types: input, output or clkout. If the pin is required to exist in the FPGA design, the type is prefixed by the word "required". One or more other words to flag that the pin is required may be used. In one embodiment, a warning is given for a missing pin, but if the required flag is set an error is given instead.

The next three fields define the core x and y coordinates of the interface block being constrained and the z index of the pad. In a 1×1 IO, the output pad has index 0 and the input pad has index 1. In a 2×2 IO, the output pads have indexes 0 and 2 and the input pads have indexes 1 and 3. In one embodiment, clkout does not have a pad and is always index −1. This matches the IO placement constraints used in the core FPGA tool. In one embodiment, dedicated clock and control interface blocks have only one input pin and it has index 1.

The fifth field defines the clock used for this port. The string "_bypass_" indicates the input or output port is not being synchronized; otherwise, it is the logical name of a clock. In one embodiment, the clock indicates it is inverted by a leading "!" or "~" character. In one embodiment, all ports except clocks are synchronized in a chip design, the clkout port defines a clock, and clock input pins are in bypass mode (e.g., an unsynchronized mode in which one or more synchronization registers are bypassed).

The sixth field defines the name of the pin from the user design assigned to this port. Clkout pins should not have names and this field should be missing. In one embodiment, if the pin output is being inverted in the interface the pin name is prefixed by a leading "!" or "~" character. If the output should be driven by a constant VCC or GND generated by the interface, then the pin name should be the string "_vcc_" or "_gnd_" respectively.

Figure 2:
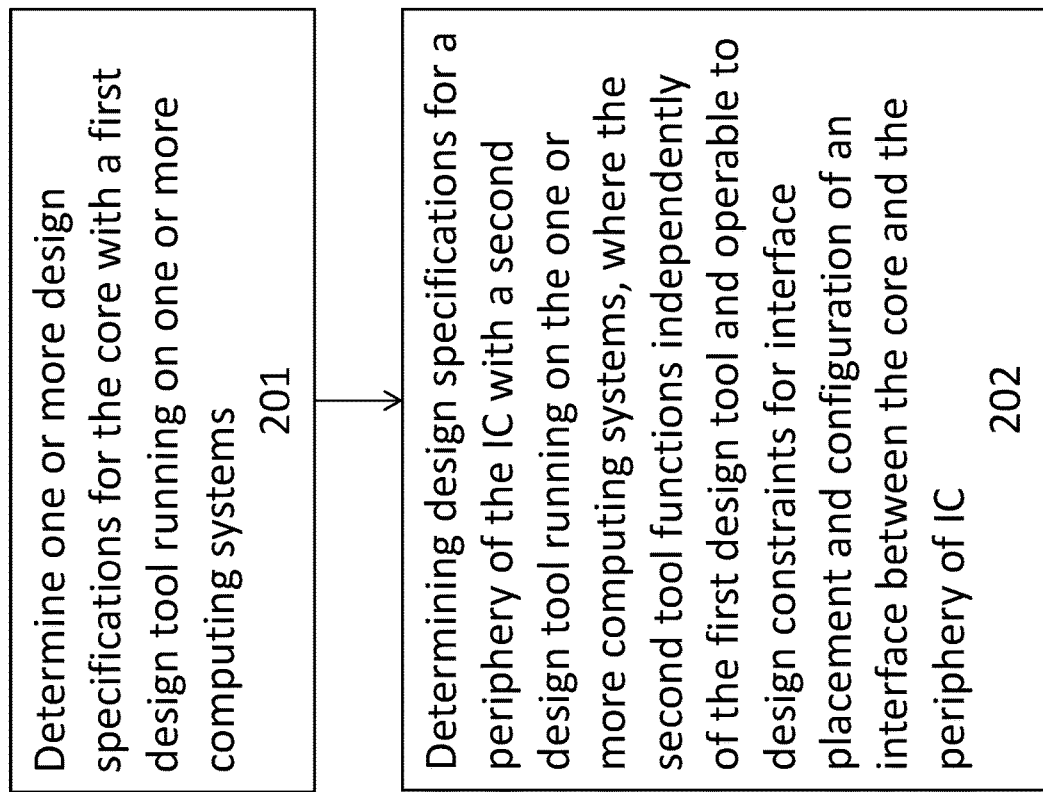
FIG. 2 is a data flow diagram of one embodiment of a process for using design tools running on one or more computing systems to implement a design of an integrated circuit (IC) having a core and a periphery.

FIG. 2 is a data flow diagram of one embodiment of a process for using design tools running on one or more computing systems to implement a design of an integrated circuit (IC) having a core and a periphery. The process is performed by processing logic that may comprise hardware (circuitry, dedicated logic, etc.), software (such as is run on a general-purpose computer system, server, or a dedicated machine), firmware, or a combination of the three. In one embodiment, the core and periphery core and a periphery having a plurality of transistors and other components, and a plurality of interconnects between the transistors and the other components, wherein the core and the periphery are formed on a single die. In one embodiment, the IC comprises an FPGA, the core is an FPGA core, and the periphery is an FPGA periphery.

Referring to FIG. 2, the process begins by processing logic determining one or more design specifications for the core with a first design tool running on one or more computing systems (processing block 201). In one embodiment, the first design tool performs a number of stages in the design process for designing the core, including a synthesis stage, a placement stage, a routing stage and a bitstream generation stage.

The process also includes processing logic determining one or more design specifications for a periphery of the IC with a second design tool running on the one or more computing systems, where the second tool functions independently of the first design tool and operable to design constraints for interface placement and configuration of an interface between the core and the periphery of IC (processing block 202). In one embodiment, the second design tool utilizes one or more of peripheral block types in the periphery, where each peripheral block type has a tool plug-in for providing a graphical user interface (GUI), rules checking and constraint generation for its associated peripheral block.

Figure 3:
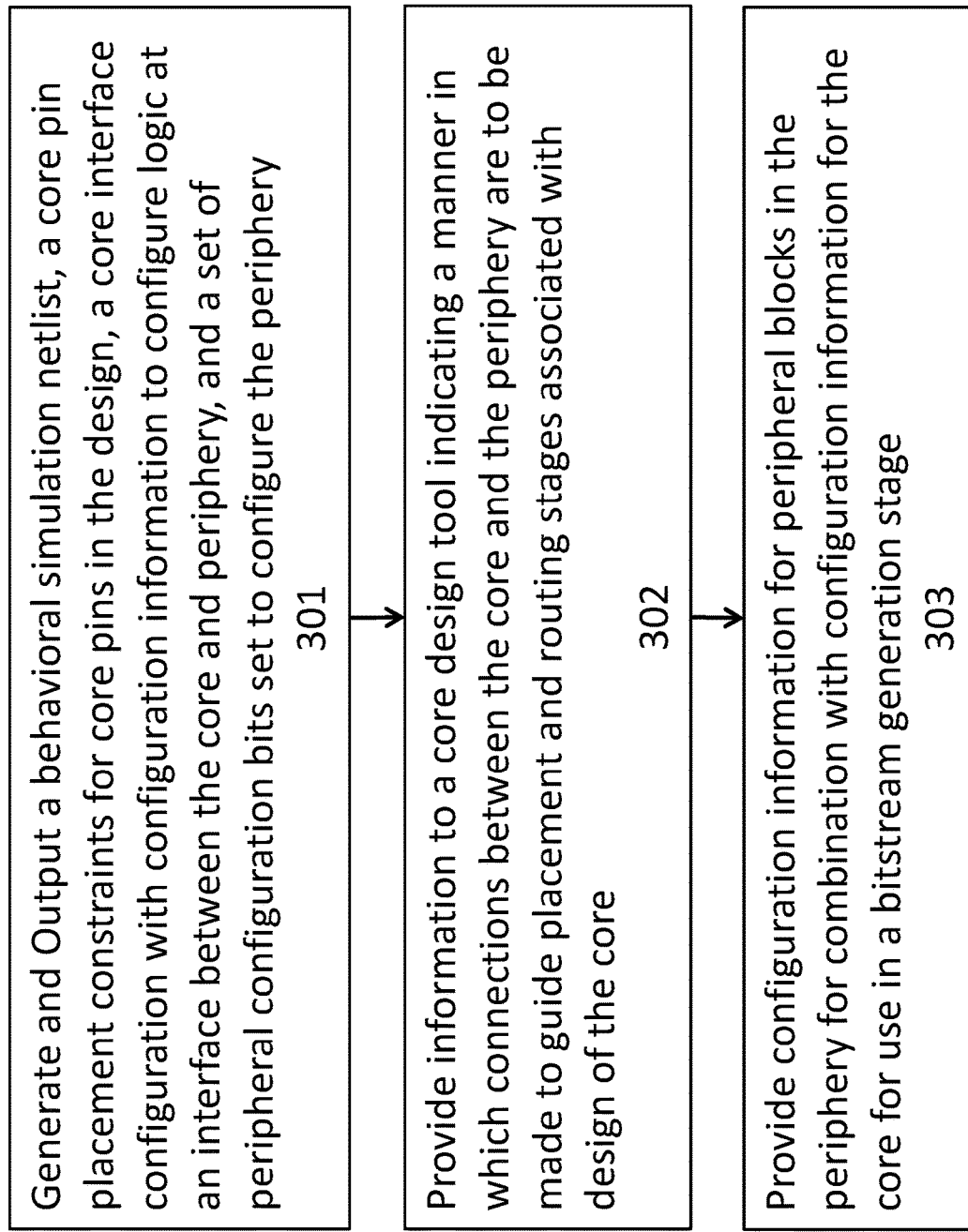
FIG. 3 is a data flow diagram of one embodiment of a process for determining one or more design specifications for a periphery of the IC.

FIG. 3 is a data flow diagram of one embodiment of a process for determining one or more design specifications for a periphery of the IC. The process is performed by processing logic that may comprise hardware (circuitry, dedicated logic, etc.), software (such as is run on a general-purpose computer system, server, or a dedicated machine), firmware, or a combination of the three.

Referring to FIG. 3, the processing begins by processing logic of the peripheral design tool generates and outputs a behavioral simulation netlist, a core pin placement constraints for core pins in the design, a core interface configuration with configuration information to configure logic at an interface between the core and periphery, and a set of peripheral configuration bits set to configure the periphery (processing block 301). In one embodiment, the behavioral simulation netlist connects peripheral block model instantiations to each other and to a core netlist to be implemented in the core. In one embodiment, the core pin placement comprises a core FPGA pin placement related to FPGA core pins in an FPGA design and the core interface configuration comprises a core FPGA interface configuration.

Next processing logic providing information to another design tool indicating a manner in which connections between the core and the periphery are to be made to guide placement and routing stages associated with design of the core (processing block 302) and providing configuration information for one or more peripheral blocks in the periphery for combination with configuration information for the core for use in a bitstream generation stage associated with design of the core (processing block 303). In one embodiment, the behavioral simulation netlist and the core pin placement constraints for core pins in the design are provided to the placement stage and the core interface configuration with configuration information to configure logic at an interface between the core and periphery and the set of peripheral configuration bits set to configure the periphery are provided to the bitstream generation stage.

Note that the techniques disclosed herein are not limited to designing a single IC. In one embodiment, the design tools may be used for designing at least part of multiple ICs (e.g., multiple ICs in the same package, multiple ICs of a same board or system, etc.) In one embodiment, along with peripheral logic that is contained in the same die, the design flow disclosed herein support multi-chip modules or even a module or development board. For example, the design flow could do a multi-chip module (MCM) with the FPGA die and an external flash memory connected to the General Purpose Input Output (GPIO) pins, but model the flash memory and the GPIO pins as one peripheral block, thereby simplifying the user interaction and expanding the device capabilities without touching the core software or FPGA hardware.

In one embodiment, the Peripheral Tool allows the peripheral blocks to be configured in a way that permits easy integration into a system. For example, the Peripheral Tool coupled be used to design an automotive module used in infotainment systems that has a well-defined framework for setting up other parts of the system before the FPGA designer works to design the core.

Figure 4:
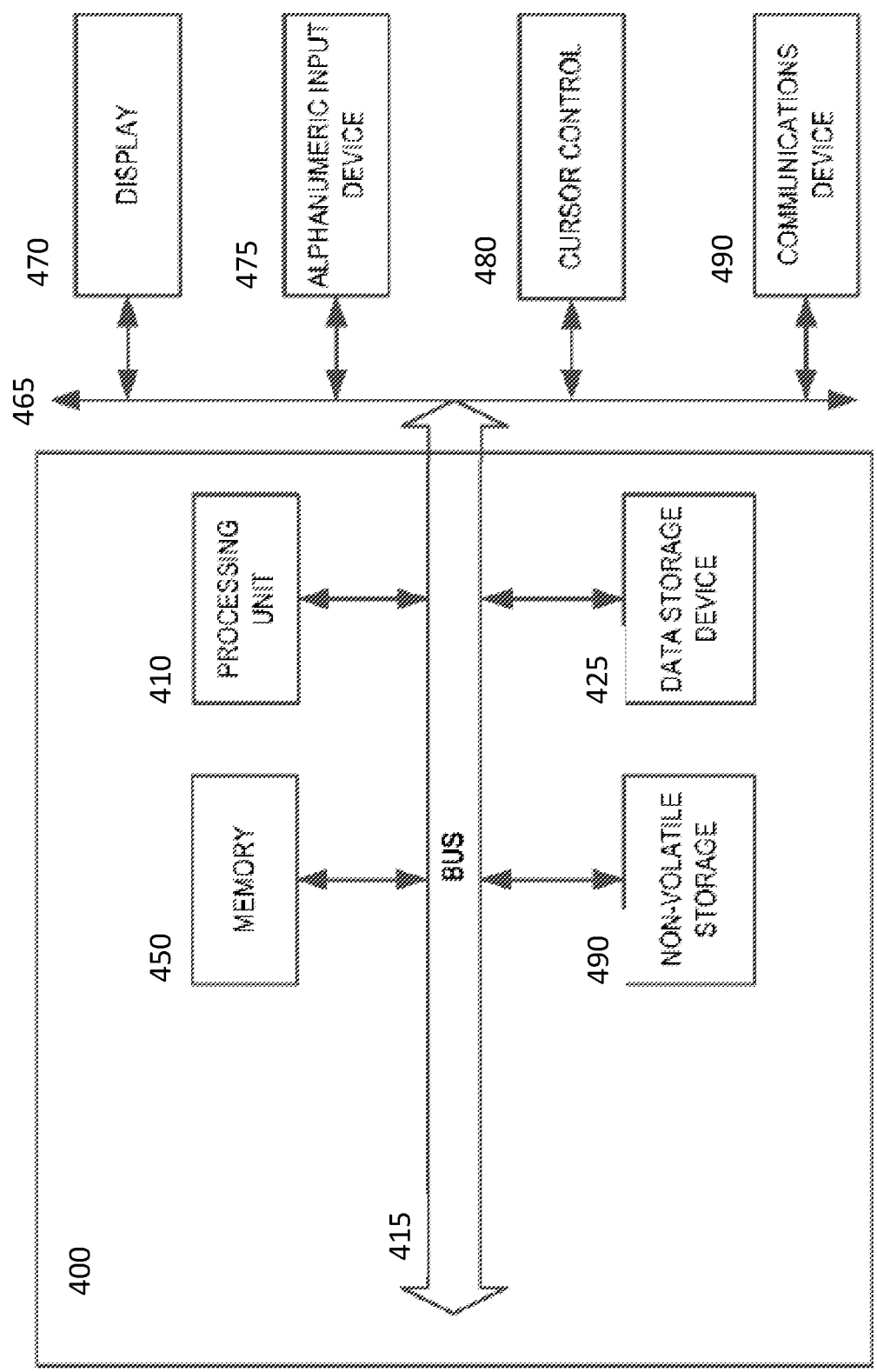
FIG. 4 is one embodiment of a computer system.

FIG. 4 is one embodiment of a computer system that may be used to support the systems and operations discussed herein. It will be apparent to those of ordinary skill in the art, however that other alternative systems of various system architectures may also be used.

The data processing system illustrated in FIG. 4 includes a bus or other internal communication means 415 for communicating information, and a processor 410 coupled to the bus 415 for processing information. The system further comprises a random access memory (RAM) or other volatile storage device 450 (referred to as memory), coupled to bus 415 for storing information and instructions to be executed by processor 410. Main memory 450 also may be used for storing temporary variables or other intermediate information during execution of instructions by processor 410. The system also comprises a read only memory (ROM) and/or static storage device 420 coupled to bus 415 for storing static information and instructions for processor 410, and a data storage device 425 such as a magnetic disk or optical disk and its corresponding disk drive. Data storage device 425 is coupled to bus 415 for storing information and instructions.

The system may further be coupled to a display device 470, such as a light emitting diode (LED) display or a liquid crystal display (LCD) coupled to bus 415 through bus 465 for displaying information to a computer user. An alphanumeric input device 475, including alphanumeric and other keys, may also be coupled to bus 415 through bus 465 for communicating information and command selections to processor 410. An additional user input device is cursor control device 480, such as a touchpad, mouse, a trackball, stylus, or cursor direction keys coupled to bus 415 through bus 465 for communicating direction information and command selections to processor 410, and for controlling cursor movement on display device 470.

Another device, which may optionally be coupled to computer system 400, is a communication device 490 for accessing other nodes of a distributed system via a network. The communication device 490 may include any of a number of commercially available networking peripheral devices such as those used for coupling to an Ethernet, token ring, Internet, or wide area network. The communication device 490 may further be a null-modem connection, or any other mechanism that provides connectivity between the computer system 400 and the outside world. Note that any or all of the components of this system illustrated in FIG. 4 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 450, mass storage device 425, or other storage medium locally or remotely accessible to processor 410.

It will be apparent to those of ordinary skill in the art that the system, method, and process described herein can be implemented as software stored in main memory 450 or read only memory 420 and executed by processor 410. This control logic or software may also be resident on an article of manufacture comprising a computer readable medium having computer readable program code embodied therein and being readable by the mass storage device 425 and for causing the processor 410 to operate in accordance with the methods and teachings herein.

The embodiments discussed herein may also be embodied in a handheld or portable device containing a subset of the computer hardware components described above. For example, the handheld device may be configured to contain only the bus 415, the processor 410, and memory 450 and/or 425. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 410, a data storage device 425, a bus 415, and memory 450, and only rudimentary communications mechanisms, such as a small touch-screen that permits the user to communicate in a basic manner with the device. In general, the more special-purpose the device is, the fewer of the elements need be present for the device to function.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

I claim:

1. An integrated circuit (IC) design system, the design system comprising:
   one or more processors; and
   a non-transitory computer readable medium connected to the one or more processors, wherein the non-transitory computer readable medium is configured to store:
      a first design tool module of a first design tool configured to determine one or more design specifications for a core of one or more integrated circuits (ICs), the ICs comprising a plurality of transistors and other components, and a plurality of interconnects between the plurality of transistors and the other components, wherein the plurality of transistors and the other components and the plurality of interconnects are formed on a single die, and a second design tool module of a second design tool configured to determine one or more design specifications for a periphery of at least one IC, the second design tool to function independently of the first tool and operable to design constraints for interface placement and configuration of an interface between the core and the periphery of the at least one IC, wherein the second design tool is operable to provide information to the first design tool indicating a manner in which connections between the core and the periphery are to be made to guide placement and routing stages associated with a design of the core.

2. The design system of claim 1 wherein the second design tool provides configuration information for one or more peripheral blocks in the periphery for combination with configuration information for the core for use in a bitstream generation stage associated with design of the core.

3. The design system of claim 1 wherein said at least one IC comprises a field programmable gate array (FPGA), the core is an FPGA core and the periphery is an FPGA periphery.

4. The design system of claim 1 wherein the second design tool is operable to output one or more of: a behavioral simulation netlist, constraints of a core pin placement for core pins in the design, a core interface configuration with configuration information to configure logic at an interface between the core and the periphery, and a set of peripheral configuration bits set to configure the periphery.

5. The design system of claim 4 wherein the core pin placement comprises a core FPGA pin placement related to FPGA core pins in an FPGA design and the core interface configuration comprises a core FPGA interface configuration.

6. The design system of claim 4 wherein the behavioral simulation netlist connects to each other between peripheral block model instantiations and to a core netlist to be implemented in the core.

7. The design system of claim 4 wherein the first design tool is operable to perform a number of stages in a design process for designing the core, the stages including a synthesis stage, a placement stage, a routing stage and a bitstream generation stage, and further wherein the constraints of the core pin placement for core pins in the IC design are provided to the placement stage and the core interface configuration with configuration information to configure logic at an interface between the core and the periphery and the set of peripheral configuration bits set to configure the periphery are provided to the stream generation stage.

8. The design system of claim 1 wherein the second design tool is operable to utilize one or more of peripheral block types in the periphery, where each peripheral block type has a tool plug-in for providing a graphical user interface (GUI), rules checking and constraint generation for its associated peripheral block type.

9. A method for using design tools running on one or more computing systems to implement a design of one or more integrated circuits (ICs), the one or more ICs comprising a core and a periphery having a plurality of transistors and other components, and a plurality of interconnects between the plurality of transistors and the other components, wherein the core and the periphery are formed on a single die, the method comprising:

with a first design tool running on the one or more computing systems, determining one or more design specifications for the core; and with a second design tool running on the one or more computing systems, determining one or more design specifications for a periphery of at least one IC, the second design tool functioning independently of the first design tool and operable to design constraints for interface placement and configuration of an interface between the core and the periphery of the at least one IC, wherein, with the second design tool running on the one or more computing systems, the second design tool provides information to the first design tool indicating a manner in which connections between the core and the periphery are to be made to guide placement and routing stages associated with a design of the core.

10. The method of claim 9 wherein, with the second design tool running on the one or more computing systems, the second design tool provides configuration information for one or more peripheral blocks in the periphery for combination with configuration information for the core for use in a bitstream generation stage associated with a design of the core.

11. The method of claim 9 wherein the at least IC comprises a field programmable gate array (FPGA), the core is an FPGA core and the periphery is an FPGA periphery.

12. The method of claim 9 wherein, with the second design tool running on the one or more computing systems, the second design tool outputs one or more of: a behavioral simulation netlist, constrains of a core pin placement for core pins in the design, a core interface configuration with configuration information to configure logic at an interface between the core and the periphery, and a set of peripheral configuration bits set to configure the periphery.

13. The method of claim 12 wherein the core pin placement comprises a core FPGA pin placement related to FPGA core pins in an FPGA design and the core interface configuration comprises a core FPGA interface configuration.

14. The method of claim 12 wherein the behavioral simulation netlist connects to each other between peripheral block model instantiations and to a core netlist to be implemented in the core.

15. The method of claim 12 wherein, with the first design tool running on the one or more computing systems, the first design tool performs a number of stages in a design process for designing the core, the stages including a synthesis stage, a placement stage, a routing stage and a bitstream generation stage, and further wherein the constraints of the core pin placement for core pins in the design are provided to the placement stage and the core interface configuration with configuration information to configure logic at an interface between the core and the periphery and the set of peripheral configuration bits set to configure the periphery are provided to bitstream generation stage.

16. The method of claim 9 wherein, with the second design tool running on the one or more computing systems, the second design tool utilizes one or more of peripheral block types in the periphery, where each peripheral block type has a tool plug-in for providing a graphical user interface (GUI), rules checking and constraint generation for its associated peripheral block type.

17. An article of manufacture having one or more non-transitory computer readable media storing instruction thereon which, when executed by a system, cause the system to perform a method for using design tools running on one or more computing systems to implement a design of one or more integrated circuits (ICs), the one or more ICs comprising a core and a periphery having a plurality of transistors and other components, and a plurality of interconnects between the plurality of transistors and the other components, wherein the core and the periphery are formed on a single die, the method comprising:

with a first design tool running on the one or more computing systems, determining one or more design specifications for the core; and with a second design tool running on the one or more computing systems, determining one or more design specifications for a periphery of at least one IC for a second design tool functioning independently of the first design tool and operable to design constraints for interface placement and configuration of an interface between the core and the periphery of the at least one IC, wherein, with the second design tool running on the one or more computing systems, the second design tool provides information to the first design tool indicating a manner in which connections between the core and the periphery are to be made to guide placement and routing stages associated with a design of the core.

18. The article of manufacture of claim 17 wherein, with the first design tool running on the one or more computing systems, the first design tool performs a number of stages in a design process for designing the core, the stages including a synthesis stage, a placement stage, a routing stage and a bitstream generation stage, and further wherein the behavioral simulation netlist and the constraints of the core pin placement for core pins in the design are provided to the placement stage and the core interface configuration with configuration information to configure logic at an interface between the core and the periphery and the set of peripheral configuration bits set to configure the periphery are provided to the bitstream generation stage.

* * * * *